United States Patent
Sansom et al.

(10) Patent No.: US 6,519,267 B1
(45) Date of Patent: Feb. 11, 2003

(54) USE OF ROBBED FRAMING BITS TO PROVIDE SECONDARY POTS CHANNEL OVER EXTENDED RANGE ISDN COMMUNICATIONS NETWORK

(75) Inventors: Michael Scott Sansom, Huntsville, AL (US); Timothy D. Rochell, Elkmont, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/351,082

(22) Filed: Jul. 9, 1999

(51) Int. Cl.$^7$ ................................................. A04J 3/12
(52) U.S. Cl. ............................................ 370/523; 370/524
(58) Field of Search ................................. 370/523, 524; 379/93.23, 93.17, 100.01

(56) References Cited

U.S. PATENT DOCUMENTS 4,922,490 A * 5/1990 Blakley ................. 370/271
5,452,306 A * 9/1995 Turudic et al. ......... 370/465
5,937,040 A * 8/1999 Wrede et al. ............. 370/524

* cited by examiner

Primary Examiner—Wellington Chin
Assistant Examiner—William Schultz
(74) Attorney, Agent, or Firm—Allen, Dyer, Doppelt, Milbrath & Gilchrist, P.A.

(57) ABSTRACT

The currently defined industry standard framing structure for 2B1Q ISDN signaling, at 160 kilobaud, provides 128 kbps for a customer (B1, B2) data channel, and 16 kbps for a data (D) channel. Of the remaining 16 kbps non payload bandwidth, 4 kbps are used for overhead maintenance data. Eight kbps of the remaining 12 kbps of non payload bandwidth, that customarily transport a repeated framing pattern, are usurped for the transport of an auxiliary compressed (from 64 KHz to 8 KHz) digitized voice POTS channel, that is sufficient to transport toll quality voice. The remaining framing pattern bandwidth is adequate prevent an unacceptable reduction in bit error rate.

17 Claims, 7 Drawing Sheets

| | | FRAMING | 2B+D | OVERHEAD BITS ($M_1$-$M_6$) | | | | | |
|---|---|---|---|---|---|---|---|---|---|
| | QUAT POSITIONS | 1-9 | 10-117 | 118s | 118m | 119s | 119m | 120s | 120m |
| | BIT POSITIONS | 1-18 | 19-234 | 235 | 236 | 237 | 238 | 239 | 240 |
| SUPERFRAME # | BASIC FRAME # | SYNC WORD | 2B+D | $M_1$ | $M_2$ | $M_3$ | $M_4$ | $M_5$ | $M_6$ |
| A | 1 | ISW | 2B+D | $eoc_{a1}$ | $eoc_{a2}$ | $eoc_{a3}$ | act | 1 | 1 |
| | 2 | CV | 2B+D | $eoc_{dm}$ | $eoc_{i1}$ | $eoc_{i2}$ | dea | 1 | febe |
| | 3 | CV | 2B+D | $eoc_{i3}$ | $eoc_{i4}$ | $eoc_{i5}$ | 1 | $crc_1$ | $crc_2$ |
| | 4 | CV | 2B+D | $eoc_{i6}$ | $eoc_{i7}$ | $eoc_{i8}$ | 1 | $crc_3$ | $crc_4$ |
| | 5 | SW | 2B+D | $eoc_{a1}$ | $eoc_{a2}$ | $eoc_{a3}$ | 1 | $crc_5$ | $crc_6$ |
| | 6 | CV | 2B+D | $eoc_{dm}$ | $eoc_{i1}$ | $eoc_{i2}$ | 1 | $crc_7$ | $crc_8$ |
| | 7 | CV | 2B+D | $eoc_{i3}$ | $eoc_{i4}$ | $eoc_{i5}$ | uoa | $crc_9$ | $crc_{10}$ |
| | 8 | CV | 2B+D | $eoc_{i6}$ | $eoc_{i7}$ | $eoc_{i8}$ | aib | $crc_{11}$ | $crc_{12}$ |
| B,C,... | | | | | | | | | |

```
1        16 17 18
| CV     | 1 | 1 |
```

| QUAT POSITIONS | FRAMING | 2B+D | OVERHEAD BITS ($M_1$-$M_6$) | | | | | |
|---|---|---|---|---|---|---|---|---|
| | 1-9 | 10-117 | 118s | 118m | 119s | 119m | 120s | 120m |
| BIT POSITIONS | 1-18 | 19-234 | 235 | 236 | 237 | 238 | 239 | 240 |
| SUPERFRAME # | BASIC FRAME # | SYNC WORD | 2B+D | $M_1$ | $M_2$ | $M_3$ | $M_4$ | $M_5$ | $M_6$ |
| A | 1 | ISW | 2B+D | $eoc_{a1}$ | $eoc_{a2}$ | $eoc_{a3}$ | act | 1 | $M_6$ |
| | 2 | SW | 2B+D | $eoc_{dm}$ | $eoc_{i1}$ | $eoc_{i2}$ | dea | 1 | febe |
| | 3 | SW | 2B+D | $eoc_{i3}$ | $eoc_{i4}$ | $eoc_{i5}$ | 1 | $crc_1$ | $crc_2$ |
| | 4 | SW | 2B+D | $eoc_{i6}$ | $eoc_{i7}$ | $eoc_{i8}$ | 1 | $crc_3$ | $crc_4$ |
| | 5 | SW | 2B+D | $eoc_{a1}$ | $eoc_{a2}$ | $eoc_{a3}$ | 1 | $crc_5$ | $crc_6$ |
| | 6 | SW | 2B+D | $eoc_{dm}$ | $eoc_{i1}$ | $eoc_{i2}$ | 1 | $crc_7$ | $crc_8$ |
| | 7 | SW | 2B+D | $eoc_{i3}$ | $eoc_{i4}$ | $eoc_{i5}$ | uoa | $crc_9$ | $crc_{10}$ |
| | 8 | SW | 2B+D | $eoc_{i6}$ | $eoc_{i7}$ | $eoc_{i8}$ | aib | $crc_{11}$ | $crc_{12}$ |
| B, C, ... | | | | | | | | | |

FIG. 1.
(PRIOR ART)

| SUPERFRAME # | QUAT POSITIONS | | FRAMING | | OVERHEAD BITS ($M_1$-$M_6$) | | | | | | |
|---|---|---|---|---|---|---|---|---|---|---|---|
| | | BIT POSITIONS | 1-9 | 10-117 | 118s | 118m | 119s | 119m | 120s | 120m | |
| | | | 1-18 | 19-234 | 235 | 236 | 237 | 238 | 239 | 240 | |
| | BASIC FRAME # | SYNC WORD | | 2B+D | $M_1$ | $M_2$ | $M_3$ | $M_4$ | $M_5$ | $M_6$ | |
| 1 | 1 | ISW | | 2B+D | $eoc_{a1}$ | $eoc_{a2}$ | $eoc_{a3}$ | act | 1 | 1 | |
| | 2 | SW | | 2B+D | $eoc_{dm}$ | $eoc_{i1}$ | $eoc_{i2}$ | ps1 | 1 | febe | |
| | 3 | SW | | 2B+D | $eoc_{i3}$ | $eoc_{i4}$ | $eoc_{i5}$ | ps2 | $crc_1$ | $crc_2$ | |
| | 4 | SW | | 2B+D | $eoc_{i6}$ | $eoc_{i7}$ | $eoc_{i8}$ | nfm | $crc_3$ | $crc_4$ | |
| | 5 | SW | | 2B+D | $eoc_{a1}$ | $eoc_{a2}$ | $eoc_{a3}$ | cso | $crc_5$ | $crc_6$ | |
| | 6 | SW | | 2B+D | $eoc_{dm}$ | $eoc_{i1}$ | $eoc_{i2}$ | 1 | $crc_7$ | $crc_8$ | |
| | 7 | SW | | 2B+D | $eoc_{i3}$ | $eoc_{i4}$ | $eoc_{i5}$ | sai | $crc_9$ | $crc_{10}$ | |
| | 8 | SW | | 2B+D | $eoc_{i6}$ | $eoc_{i7}$ | $eoc_{i8}$ | 1 | $crc_{11}$ | $crc_{12}$ | |
| 2,3,... | | | | | | | | | | | |

FIG. 2.
(PRIOR ART)

| QUAT POSITIONS | | FRAMING | 2B+D | OVERHEAD BITS ($M_1$-$M_6$) | | | | | | |
|---|---|---|---|---|---|---|---|---|---|---|
| BIT POSITIONS | | 1-9 | 10-117 | 118s | 118m | 119s | 119m | 120s | 120m | |
| | | 1-18 | 19-234 | 235 | 236 | 237 | 238 | 239 | 240 | |
| SUPERFRAME # | BASIC FRAME # | SYNC WORD | 2B+D | $M_1$ | $M_2$ | $M_3$ | $M_4$ | $M_5$ | $M_6$ | |
| A | 1 | ISW | 2B+D | $eoc_a1$ | $eoc_a2$ | $eoc_a3$ | act | 1 | 1 | |
| | 2 | CV | 2B+D | $eoc_{dm}$ | $eoc_i1$ | $eoc_i2$ | dea | 1 | febe | |
| | 3 | CV | 2B+D | $eoc_i3$ | $eoc_i4$ | $eoc_i5$ | 1 | $crc_1$ | $crc_2$ | |
| | 4 | CV | 2B+D | $eoc_i6$ | $eoc_i7$ | $eoc_i8$ | 1 | $crc_3$ | $crc_4$ | |
| | 5 | SW | 2B+D | $eoc_a1$ | $eoc_a2$ | $eoc_a3$ | 1 | $crc_5$ | $crc_6$ | |
| | 6 | CV | 2B+D | $eoc_{dm}$ | $eoc_i1$ | $eoc_i2$ | 1 | $crc_7$ | $crc_8$ | |
| | 7 | CV | 2B+D | $eoc_i3$ | $eoc_i4$ | $eoc_i5$ | uoa | $crc_9$ | $crc_{10}$ | |
| | 8 | CV | 2B+D | $eoc_i6$ | $eoc_i7$ | $eoc_i8$ | aib | $crc_{11}$ | $crc_{12}$ | |
| B, C, ... | | | | | | | | | | |

| SUPERFRAME # | | QUAT POSITIONS | FRAMING | 2B+D | OVERHEAD BITS ($M_1$–$M_6$) | | | | | |
|---|---|---|---|---|---|---|---|---|---|---|
| | | BIT POSITIONS | 1-9 | 10-117 | 118s | 118m | 119s | 119m | 120s | 120m |
| | | BASIC FRAME # | 1-18 | 19-234 | 235 | 236 | 237 | 238 | 239 | 240 |
| | | SYNC WORD | | | $M_1$ | $M_2$ | $M_3$ | $M_4$ | $M_5$ | $M_6$ |
| 1 | 1 | | ISW | 2B+D | $eoc_{a1}$ | $eoc_{a2}$ | $eoc_{a3}$ | act | 1 | 1 |
| | 2 | | CV | 2B+D | $eoc_{dm}$ | $eoc_{i1}$ | $eoc_{i2}$ | ps1 | 1 | febe |
| | 3 | | CV | 2B+D | $eoc_{i3}$ | $eoc_{i4}$ | $eoc_{i5}$ | ps2 | crc1 | crc2 |
| | 4 | | CV | 2B+D | $eoc_{i6}$ | $eoc_{i7}$ | $eoc_{i8}$ | nfm | crc3 | crc4 |
| | 5 | | SW | 2B+D | $eoc_{a1}$ | $eoc_{a2}$ | $eoc_{a3}$ | cso | crc5 | crc6 |
| | 6 | | CV | 2B+D | $eoc_{dm}$ | $eoc_{i1}$ | $eoc_{i2}$ | 1 | crc7 | crc8 |
| | 7 | | CV | 2B+D | $eoc_{i3}$ | $eoc_{i4}$ | $eoc_{i5}$ | sai | crc9 | crc10 |
| | 8 | | CV | 2B+D | $eoc_{i6}$ | $eoc_{i7}$ | $eoc_{i8}$ | 1 | crc11 | crc12 |
| 2,3,... | | | | | | | | | | |

| 1 | ... | 16 | 17 | 18 |
|---|---|---|---|---|
| CV | | | 1 | 1 |

FIG. 4.

USE OF ROBBED FRAMING BITS TO PROVIDE SECONDARY POTS CHANNEL OVER EXTENDED RANGE ISDN COMMUNICATIONS NETWORK

FIELD OF THE INVENTION

The present invention relates in general to communication systems, and is particularly directed to a modification of the framing pattern employed in the transport of integrated services digital network (ISDN) communications over a two-wire telephone wireline channel, to replace selected portions of the framing structure in order to provide for the transport of a secondary or auxiliary plain old telephone system (POTS) channel.

BACKGROUND OF THE INVENTION

Although ISDN is a digital subscriber loop (DSL) technology that provides for the integration of both voice and data onto a single subscriber loop, ISDN subscribers often maintain a separate analog (POTS) line for voice communications. For example, a 'work at home' telco customer may have an ISDN line for business purposes, and employ a separate analog line for private residential use. This dual line configuration may present an installation problem to the telephone service provider, as it requires the provider to provide two subscriber loops which may be problematic due to the limited number of subscriber pairs that may be available. It would be desirable to have the flexibility of supplying both POTS and ISDN services over a single subscriber loop.

SUMMARY OF THE INVENTION

Pursuant to the invention, this objective is successfully achieved by usurping selected portions of the framing pattern that make up a repeated data framing mechanism employed in the transport of integrated services digital network (ISDN) communications over a single two-wire telephone wireline channel, and replacing the these usurped portions of the framing pattern with data bits of a compressed secondary POTS channel for transport over that same two-wire pair.

Currently defined industry standard (ANSI directive T1.601-1992) framing structure for 2B1Q ISDN signaling operating at a data rate of 160 kilobaud (kb), specify that 128 kbps are available for customer (bearer (B1, B2) channel) data, and 16 kbps are available for control or data (D) channel. Of the remaining 16 kbps of non-payload bandwidth (e.g., eoc, M4, CRC, etc), 4 kbps are used for overhead maintenance data. The remaining 12 kbps of the non payload bandwidth are used to transport a synchronization framing pattern, made up of an eighteen bit sync word repeatedly transmitted every one and a half milliseconds and used to define basic frame boundaries. A superframe contains eight basic frames and is defined by inverting the first or initial sync word for the first basic frame of the superframe.

The invention takes advantage of the fact that recently developed ISDN communication methodologies are capable of operating at very low bit error rates, which allows replacing a portion of the 12 KHz framing bandwidth with an auxiliary (compressed) voice channel, without suffering an unacceptable increase in synchronization errors. For this purpose, the conventional framing structure is modified to include only the (36) sync word framing bits of selected (e.g., the first and fifth) basic frames of a respective superframe. The framing bits of the remaining six basic frames are replaced an 8 kbps compressed secondary or auxiliary POTS channel which, as a result of recent advances in voice compression techniques, is sufficient to transport toll quality voice.

For an 8 kbps channel, sixteen of the available eighteen bits of each of the six usurped basic frame sync words are replaced with two bytes of the compressed auxiliary voice channel. The remaining two bits of each usurped basic frame sync word are set to a prescribed value (e.g., '1'), so as to leave only one kbps of unused data bandwidth. To implement the invention, each end of an ISDN communication system, such as one providing extended range service between a central office site and a customer premises set is augmented to include an associated auxiliary channel interleaving transceiver unit, which controllably replaces the usurped basic frame data with the 8 kbps compressed voice channel.

This framing data-usurping transceiver unit comprises a transceiver (such as a Total Reach transceiver manufactured by Adtran Corp., Huntsville, Ala. (Total Reach being a Registered Trademark of Adtran Corp.). This transceiver is coupled to interface standard 2B1Q ISDN communication signals with the local ISDN-dedicated loop, and to synchronously interface 2B+D ISDN data with a framer/deframer unit. Synchronous serialized data transfers of eighteen bits of (144 kbps) 2B+D customer data are effected in accordance with a clock signal that is locked to a network 8 KHz clock.

The framer/deframer unit has a transmit port coupled to a digital/analog interface and is operative to output 144 kbps of scrambled 2B+D user data, 4 kbps of maintenance, 3 kbps of framing, 1 kbps of unused data, and an (8 kbps) auxiliary compressed voice channel (CV), that is provided by way of a voice compression-decompression circuit chip. The voice compression-decompression circuit is operative to compress a 64 kbps uncompressed voice channel (provided by an associated μ-law codec and SLIC that are interfaced with an auxiliary POTS channel) into an 8 kbps compressed voice channel. To accommodate a continuous 8 KHz clock used by the voice compression chip to transfer data, an N-bit by 1-bit FIFO is coupled in the transmit and receive data paths of the framer.

On the loop transmit side, the framer/deframer unit includes a transmit slip buffer that is employed to ensure synchronization with network timing of the customer and the compressed auxiliary voice channel data, which tend to be 'bursty'. The transmit slip buffer is coupled to the transmit link of the bidirectional port of the transceiver and receives frame sync control from the transceiver's supervisory microcontroller. The slip buffer is also coupled to supply 2B+D data and modified framing pattern data to a transmit multiplexer. The transmit multiplexer is coupled to receive maintenance data from the transceiver control bus and 8 kbps compressed voice channel data from the transmit/receive FIFO. The multiplexer interleaves each of its data inputs into an outgoing data stream which is scrambled into a scrambled serial data stream for application to the loop.

On the loop receive side, the framer/deframer unit has a receive slip/elastic buffer coupled to receive 2B+D data and modified framing data supplied from a demultiplexer (deframer) unit, to which descrambled serial data stream received from the loop is applied. The demultiplexer also outputs maintenance data and couples compressed voice data supplied through the FIFO to the voice compression-decompression circuit. As an incoming scrambled data steam from the far end of the loop is descrambled by data descrambler, it is demultiplexed into a 144 Mbps customer ISDN (2B+D) channel, an 8 KHz auxiliary composed POTS data, 4 kbps maintenance channel and a 3 kbps modified framing data channel. The remaining unused 1 kbps channel associated with the two '1' bits of each usurped basic frame is used only for timing synchronization. The 144 kbps ISDN customer data is output as a standard 144 kbps 2B1Q ISDN channel by the U transceiver over the local ISDN tip/ring loop. The auxiliary POTS voice channel decompressed from 8 kbps to 64 kbps and coupled to a local tip/ring POTS interface via the $\mu$-law codec and associated SLIC.

BRIEF DESCRIPTION OF THE DRAWINGS

FIGS. 1 and 2 show the contents of the framing structure according to ANSI directive T1.601-1992 for 2B1Q ISDN signaling, for network-to-NT and NT-to-network directed ISDN communications, respectively;

FIGS. 3 and 4 show the manner in which the contents of the framing structures of FIGS. 1 and 2, respectively, are modified in accordance with the present invention to provide for the transport of a secondary 8 kbps compressed POTS channel;

DETAILED DESCRIPTION

Figure 5:
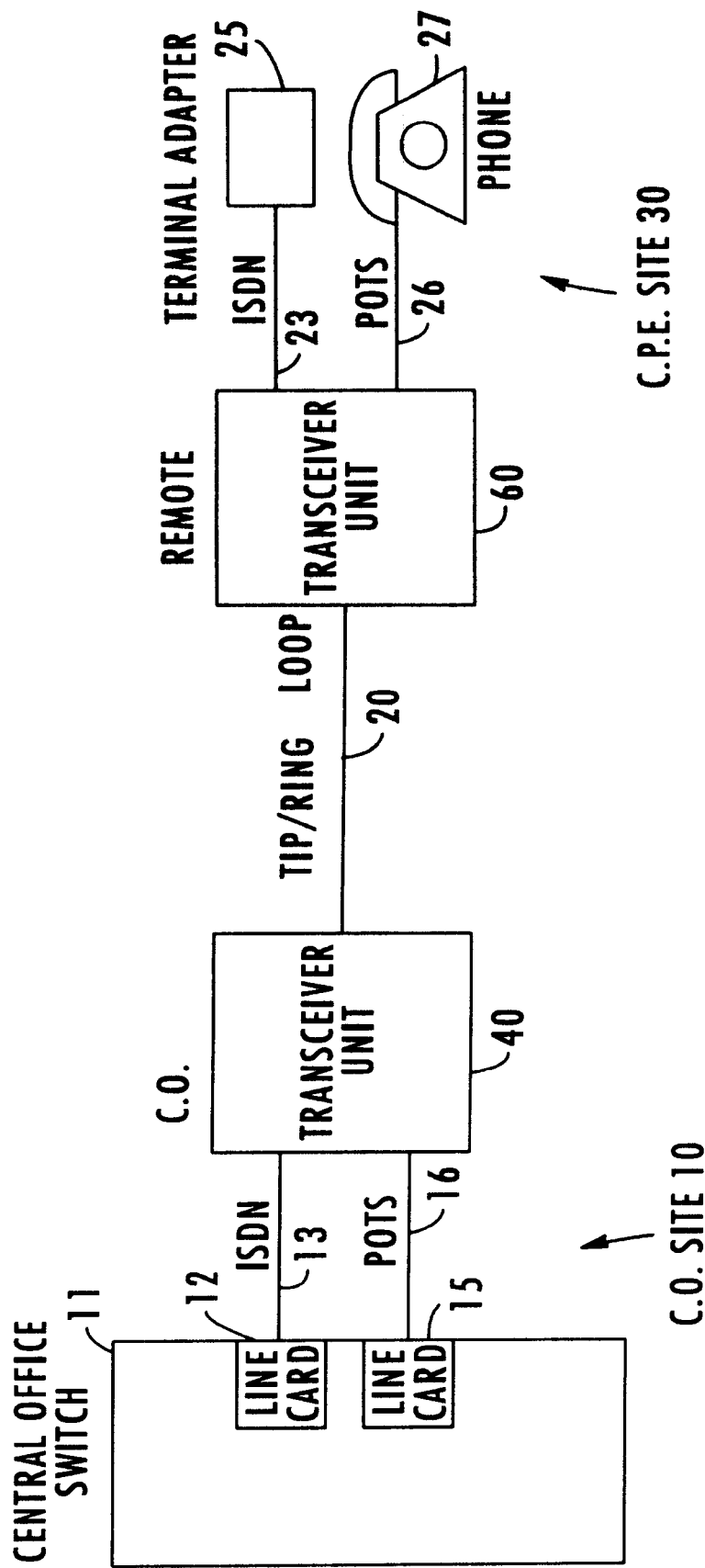
FIG. 5 shows a reduced complexity example of an ISDN communication system, that is configured to implement the modified framing structure of FIGS. 3 and 4 to provide for the transport of a secondary 8 kbps compressed POTS channel.

Before describing the ISDN framing usurping mechanism of the present invention, it should be observed that the invention resides primarily in what is effectively a pre-scribed set of conventional telecommunication signaling hardware components and attendant supervisory communications microprocessor circuitry therefor, that controls the operations of such components. Consequently, the configuration of such components and the manner in which they are interfaced with other communication equipment of a telephone network have, for the most part, been illustrated in the drawings by readily understandable block diagrams, which show only those specific details that are pertinent to the invention, so as not to obscure the disclosure with details which will be readily apparent to those skilled in the art having the benefit of the present description. The block diagrams of the Figures are primarily intended to show the major components of the system in a convenient functional grouping, whereby the present invention may be more readily understood.

In order to facilitate an appreciation of the selected framing pattern replacement mechanism of the invention, it is initially useful to examine the currently defined industry standard framing structure employed for ISDN communications over an individual telephone subscriber copper wire pair. For this purpose, FIGS. 1 and 2 respectively show the contents of the framing structure according to ANSI directive T1.601-1992 for 2B1Q signaling, for network-to-NT and NT-to-network directed ISDN communications.

In accordance with this customarily employed framing structure, for a currently installed ISDN basic rate digital subscriber line operating at a data rate of 160 kilobaud (kb), there are 128 kbps of customer data in the form of two bearer (B1 and B2) channels and one 16 kbps control or data (D) channel. Of the remaining 16 kbps of non payload data, 4 kbps are used to transport overhead maintenance data in the form of an extended operations channel (eoc), and other maintenance (m) data. The remaining 12 kbps of the D channel are used to carry a synchronization framing pattern, comprised of an eighteen bit sync word (SW) that is repeatedly transmitted every one and a half milliseconds and defines the basic frame boundaries. A superframe (SF) is twelve milliseconds in duration and contains eight basic frames. The SF boundary is defined by inverting the first or initial sync word (ISW) for the first basic frame of the superframe.

Because recently developed ISDN communication methodologies, such as that described in U.S. Pat. No. 5,809,033, issued Sep. 15, 1998, by M. Turner et al, entitled: "Use of Modified Line Encoding and Enhanced Signal Processing to Extend Range of Digital Data Transmission Over Repeaterless Two-wire Telephone Link," assigned to the assignee of the present application and the disclosure of which is herein incorporated, are capable of operating at very low bit error rates (e.g., on the order of less than $10^{-7}$), using a total of 12 kbps of the overall 160 kbaud ISDN data rate just for framing is considered to be an excessive amount of bandwidth for that purpose.

As pointed out briefly above, pursuant to the invention, this relatively large or excessive amount of framing bandwidth can be significantly reduced (to only 3 kbps or one-fourth of that conventionally employed), without suffering an unacceptable increase in synchoronization error. For this purpose, as illustrated in the FIGS. 3 and 4, the respective framing structures of FIGS. 1 and 2 are modified to include only the (36) sync word framing bits of the first and fifth basic frames of a respective superframe. In accordance with the invention, the (108) framing bits of the remaining six (second through fourth, and sixth through eighth) basic frames (sync words) are replaced with compressed voice data of a compressed secondary or auxiliary POTS channel.

In particular, sixteen of the available eighteen bits of each of the six usurped basic frame sync words (SW) are replaced with two bytes of an (8 kbps) compressed auxiliary voice (CV) channel which, as a result of recent advances in voice compression, is sufficient to transport toll quality voice. The remaining two bits of each usurped basic frame sync word are set to a prescribed value (e.g., '1'), so as to leave only one kbps of unused data bandwidth.

Figure 6:
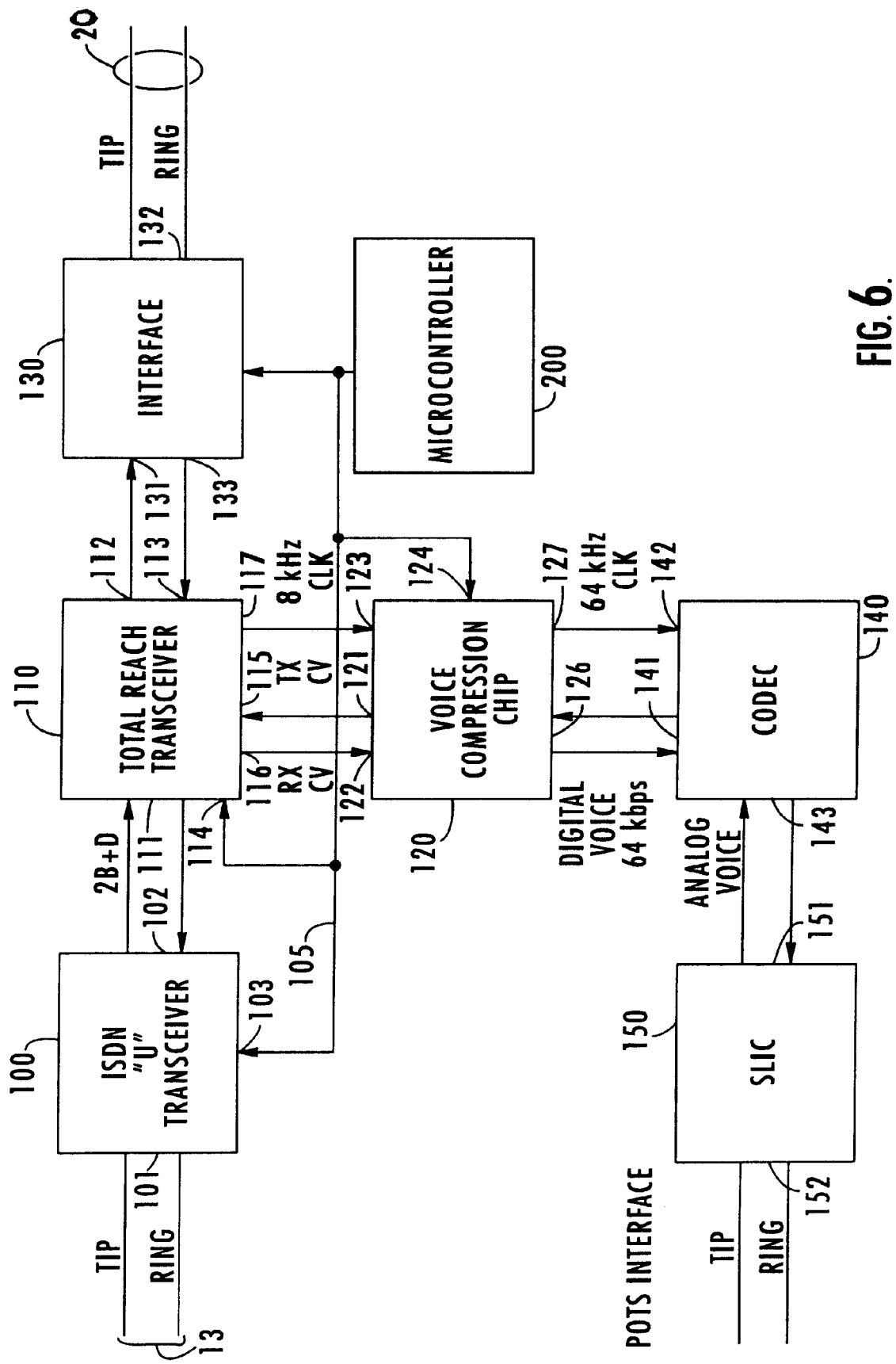
FIG. 6 diagrammatically illustrates the configuration of each of the central office transceiver unit 40 and the CPE transceiver unit 60 of the system of FIG. 5.
Figure 7:
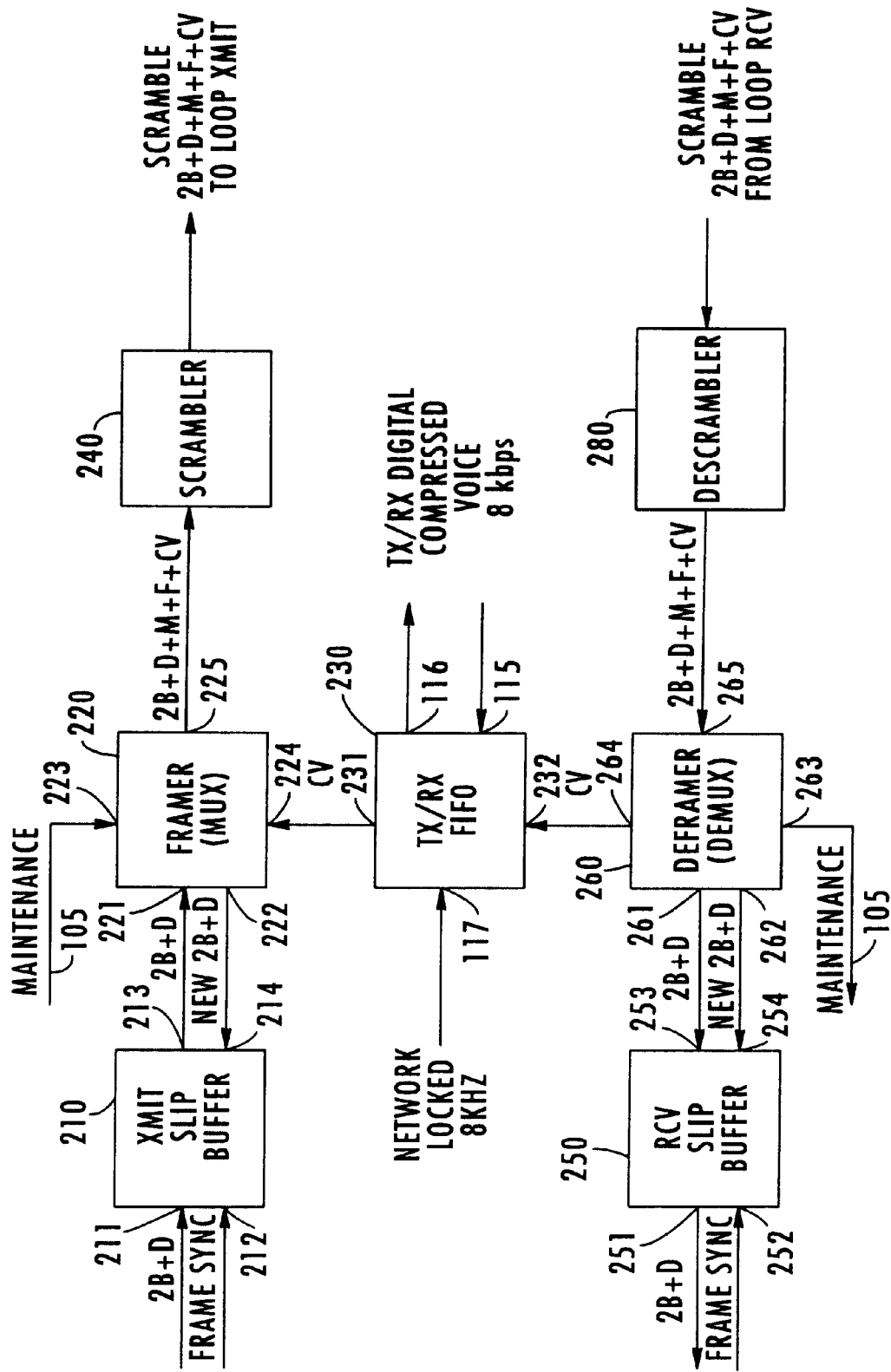
FIG. 7 shows the architecture of a framer/deframer unit 110 of FIG. 6.

A non-limiting example of an ISDN communication architecture that is effective to implement the above-described framing-replacement mechanism of FIGS. 3 and 4 is diagrammatically illustrated in FIGS. 5–7. In particular, FIG. 5 shows a reduced complexity example of an extended range ISDN communication system, such as that described in the Turner et al Patent, which is intended to enable a telephone service provider to supply multiple types of signalling channels between a central office (CO) site 10, located at a 'west' end of (an extended range) copper wire (tip/ring) pair 20, and customer premises equipment (CPE) 30, located at an 'east' end of copper wire pair 20.

The west end central office site 10 contains a central office switch 11 (such as an AT&T 5ESS switch), having a plurality of line termination circuits (or line cards), one being shown at 12 for ISDN communications. Line card 12 is coupled over a local ISDN-dedicated loop (twisted tip/ring pair) 13 to what is termed in the telephone industry as a Total Reach Central Office (TR-CO) transceiver card, installed in a central office associated transceiver unit 40, shown in FIG. 6.

The central office switch 11 further includes a POTS line card 15, which is coupled over a local analog loop (twisted tip/ring pair) 16 to a subscriber line interface circuit (SLIC) in the central office associated transceiver unit 40. This transceiver unit 40 includes an analog front end or interface that is coupled to the west end of the copper wire pair 20. In a complementary manner, at the CPE site 20, the east end of the loop 20 includes a Total Reach remote unit (TR-RMT) unit 60 (owned by the telephone company), configured in the same manner as the transceiver unit 40 at the central office site, and coupled to over a local ISDN-dedicated loop (twisted tip/ring pair) 23 to an ISDN terminal adapter 25, and over a local analog loop 26 to a customer's POTS phone 27.

The configuration of each of the TR-CO transceiver unit 40 and the TR-RMT transceiver unit 60 is diagrammatically illustrated in FIG. 6 as comprising a U-Interface transceiver 100, having a first bidirectional communication port 101 which is coupled to interface standard 2B1Q ISDN communication signals with the local ISDN-dedicated loop (twisted tip/ring pair). U-Interface transceiver 100 has a second bidirectional communication port 102, which is coupled to synchronously interface 2B+D ISDN data with a first port 111 of a framer/deframer unit 110 (shown in detail in FIG. 7, to be described). Synchronous serialized data transfers of eighteen bits of (144 kbps) 2B+D data are effected every 125 $\mu$s in accordance with an 8 KHz clock signal supplied by the framer/deframer unit 110 that is locked to a network 8 KHz clock signal. The U-Interface transceiver 100 also has a control port 103 coupled to an intra transceiver control bus 105, which conveys status and control signals with respect to a supervisory microcontroller 200.

The Total Reach Transceiver unit 110 has an outgoing or transmit port 112, which is coupled to a first port 131 of a conventional digital/analog interface 130 and is operative to output 144 kbps of scrambled 2B+D user data, 4 kbps of maintenance, 3 kbps of framing, 1 kbps of unused data, and an (8 kbps) auxiliary compressed voice channel (CV), that is provided by way of a voice compression-decompression circuit chip 120 from a second port 132 of interface 130 onto (extended range) tip and ring pair 20. As a non-limiting example, the voice compression-decompression chip may comprise a commercially available circuit that uses a continuous 8 KHz clock to transfer data. To accommodate this continuous clock, an N-bit (e.g., N=32) by 1-bit first-in, first-out (FIFO) buffer is coupled in the transmit and receive data paths of the framer, as will be described.

The compressed 8 kbps auxiliary POTS voice channel data to be transmitted to the far end of the loop 20 is supplied from a compressed voice output port 121 of the voice compression-decompression circuit 120 to an auxiliary input (transmit) data port 115 of the framer/deframer 110. In the transmit or outgoing direction, the voice compression-decompression circuit 120 is operative to compress a 64 kbps uncompressed voice channel (provided by an associated $\mu$-law codec 140 and SLIC 150 that are interfaced with an auxiliary POTS channel) into an 8 kbps compressed voice channel.

In the receive or incoming direction, the voice compression-decompression circuit 120 is operative to decompress an 8 kbps compressed voice channel into a 64 kbps uncompressed voice channel for application to the codec 140 and SLIC 150, so as to be interfaced with the auxiliary POTS channel. For this purpose, an incoming 8 kbps compressed POTS voice channel data received from the far end of the loop 20 is coupled from an auxiliary output (receive) data port 116 to the compressed voice input port 122 of the voice compression-decompression circuit 120. The (8 KHz) clock signal associated with the compressed voice channel is provided at clock port 117 of Total Reach Transceiver unit 110 and coupled to an 8 KHz clock port 123 of voice compression-decompression circuit 120. A control/status port 124 of the voice compression-decompression circuit 120 is coupled to control bus 105.

The Total Reach Transceiver unit 110 further includes an incoming or receive port 113, which is coupled to a third port 133 of the digital/analog interface 130 and is operative, in a complementary manner to that described above, to receive 160 kbps of incoming data from the far end of the tip and ring pair 20, comprised of scrambled 2B+D user data, maintenance, framing, unused and auxiliary compressed Cv data. The Total Reach Transceiver unit 110 has a fourth port 114, which is coupled to receive a frame sync control signal conveyed over the control bus 105 from the transceiver microcontroller 200.

The voice compression-decompression circuit 120 further includes a bidirectional port 126, through which uncompressed 64 kbps voice channel signals are interfaced with a bidirectional digital voice data port 141 of codec 140. In addition, a clock port 127 of voice compression-decompression circuit 120 supplies a 64 KHz clock signal to a clock port 142 of the codec 140. On the analog side, the codec 140 has a bidirectional analog port 143, through which analog voice signals of the auxiliary POTS channel are interfaced with a first bidirectional port 151 of SLIC 150. A second bidirectional port 152 of SLIC 150 is coupled to a POTS tip/ring pair (e.g., the local loop 16 at the central office end 10 of the loop 20).

The Total Reach Transceiver unit 110 is shown in detail in FIG. 7. On the loop transmit side the framer/deframer unit 110 comprises a transmit slip or elastic buffer 210, which is used to ensure synchronization of the customer and 2B+D data, which tend to be 'bursty', with network timing. The transmit slip buffer 210 has a first input port 211 coupled to the transmit link of the bidirectional port 102 of the U-Interface transceiver 100, and a second sync control port 212 coupled to receive a frame sync control signal conveyed from the U-Interface transceiver 100. The transmit slip buffer 210 also has a first output port 213 which is coupled to supply 2B+D data to a first input port 221 of a multiplexer (framer) unit 220, and a second input port 214 coupled to receive modified framing information from a second output port 222 of multiplexer unit 220.

A third input port 233 of the multiplexer unit 220 is coupled to receive maintenance data from the transceiver control bus 105, and a fourth input port 224 coupled to receive compressed voice data supplied from an output port 231 of transmit/receive FIFO 230. The compressed (8 Kb/s) auxiliary POTS voice data from the voice compression-decompression circuit 120 is coupled to the FIFO 230 by way of transmit port 115. The 8 KHz network clock port is shown at 117. Multiplexer 220 has an output port 225, from which the data applied to input ports 221–224 is interleaved as an outgoing data stream formatted in the manner shown in one of FIGS. 3 and 4, in accordance with the location of the unit (network or NT side of the loop 200). Output port 225 is coupled to a data scrambler 240, which is operative to randomize the framed serial data, so as to ensure full spectral occupancy of the transmission band of the transport link 20, enabling proper operation of adaptive elements in the far end transceiver. Data Scrambler 240 may comprise a conventional feed-forward, modulo-two scrambler, containing a multi stage shift register and exclusive OR circuitry coupled to selected stages thereof. For extended range operation, the output of data scrambler 240 is preferably subjected to the code conversion mechanism described in the Turner et al Patent, prior to being coupled to the interface 130. As described in that application, the serial data stream output of data scrambler 240 is converted into parallel format and then Trellis encoded. The Trellis-encoded data is processed through a 4B1H (four binary, one hex/sixteen level) code translator. The resulting 4B1H code is then subjected to Tomlinson precoder filtering prior to being converted into analog format and passed through a low pass transmit shaping filter in the interface 130.

On the loop receive side, the framer/deframer unit 110 comprises a receive slip/elastic buffer 250 having a data output port 251 coupled to the receive link of the bidirectional port 102 of the U-Interface transceiver 100, and a sync port 252 coupled to receive the frame sync control signal from U-Interface transceiver 100. The receive slip buffer 250 has a first input port 253, which is coupled to receive 2B+D data supplied from a first output port 261 of a demultiplexer (deframer) unit 260. A second input port 254 of the receive slip buffer 250 is coupled to receive the modified framing information from a second output port 262 of demultiplexer unit 260.

Demultiplexer unit 260 has a third output port 263 which outputs maintenance data onto the control bus 105. A fourth output port 264 of demultiplexer unit 260 is coupled to supply compressed voice data supplied to input port 232 of the FIFO 230. Extracted (demultiplexed) compressed (8 Kb/s) voice data is coupled to the voice compression circuit 120 by way of receive port 116. The demultiplexer 260 has an input port 265, to which a descrambled interleaved data stream formatted in the manner shown in one of FIGS. 3 and 4, described above, is supplied from a data descrambler 280. The data descrambler 280 is coupled to receive a scrambled serial data stream from the interface 130.

For extended range operation, in which the incoming data stream has been subjected to the code conversion mechanism described in the Turner et al Patent, the input port 113 of the framer/deframer 110 is coupled through the receiver data path, which includes an adaptive equalizer, modulo-unit and Viterbi decoder described therein. The output of the Viterbi decoder is serialized and coupled to the data descrambler 280.

OPERATION

For purposes of providing a non-limiting example, the operation of the transceiver 40 at the network end 10 of the loop 20 will be described. It will understood that a complementary operation takes place in the transceiver 60 at the customer premises (NT) end 30 of the loop. As 144 kbps of standard 2B1Q ISDN customer data is supplied to the first bidirectional communication port 101 of U-Transceiver 100 from the local ISDN loop 13, it is output from the U-Interface transceiver port 102 as a serialized 2B+D data stream, and coupled therefrom to the first input port 211 of the transmit slip buffer 210. The transmit slip buffer 210 makes the 2B+D data available to the framer-multiplexer 220, which is running at the line bit rate of 160 kbps. This 144 kbps of customer (ISDN) data is then interleaved with the modified framing bits, maintenance data, and whatever auxiliary 8 kbps POTS channel data is provided by the voice compression chip-interfacing FIFO 230.

As described above, and as shown in FIG. 3, in the network-to-customer premises direction, the multiplexing operation is such as to insert successive bits of the auxiliary (8 kbps) compressed voice channel into the first sixteen usurped or robbed bits of the available eighteen bits of the robbed basic frame sync works SW2–SW4 and SW6–SW8. The remaining two bits (bits $b_{17}$ and $b_{18}$) of each of the robbed frame bit sync words are set to a prescribed value (e.g., '1'), as described above. The resulting interleaved data stream is then coupled from output port 225 of the multiplexer 220 as a composite data stream to the data scrambler 240, which outputs a scrambled serial data stream for (extended range code conversion and) application to the analog interface 130, as described above.

On the loop receive side, as an incoming scrambled data steam from the far end (customer premises end) of the loop 20 is descrambled by data descrambler 280, it is demultiplexed by deframer-demultiplexer 260 into a 144 Mbps customer ISDN data channel, an 8 KHz auxiliary POTS data, a 4 kbps data channel and a 3 kbps modified framing data channel. The remaining unused 1 kbps channel associated with the two '1' bits of each usurped basic frame is used only for timing synchronization. The 144 kbps ISDN customer data is output as a standard 144 kbps 2B1Q ISDN channel by the U transceiver 100 over the local ISDN tip/ring loop 13 to the ISDN line card 12 installed in the central office switch 11 of the west end central office site 10. The decompressed auxiliary POTS voice channel is coupled over the local twisted tip/ring pair 16 to an associated central office switch-resident POTS line card 15.

As will be appreciated from the foregoing description of the invention, the desirability of supplying both POTS and ISDN services over the same subscriber loop is successfully achieved by replacing selected portions of what, in practical terms, is an unnecessarily large framing pattern bandwidth with data bits of an 8 kbps compressed secondary POTS channel, which is sufficient to transport toll quality voice. As a result, both 144 kbps customer data and an 8 kbps auxiliary POTS channel can be interleaved for transport over the same two-wire pair. While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of transporting a secondary voice channel by way of an integrated services digital network (ISDN) communication link having a transport bandwidth that includes a bearer channel bandwidth, a data channel bandwidth, maintenance channel bandwidth and a framing pattern bandwidth, comprising the steps of:

(a) providing a digitized secondary voice channel that is compressed to a bandwidth less than said framing pattern bandwidth; and (b) replacing a portion of framing information contained in said framing pattern bandwidth with said digitized secondary voice channel provided in step (a).

2. A method according to claim 1, wherein step (b) comprises replacing contents of a plurality of segments of repeated framing information contained in said framing pattern bandwidth with contents of said digitized secondary voice channel.

3. A method according to claim 2, wherein said contents of said digitized secondary voice channel are interleaved with prescribed segments of framing information of said framing pattern bandwidth.

4. A method according to claim 3, wherein first and second framing code patterns of said framing pattern bandwidth are alternately interleaved with said contents of said digitized secondary voice channel replacing said pluralities of segments of repeated framing information.

5. A method according to claim 4, wherein said first code pattern is an inverse of said second code pattern.

6. A method according to claim 1, wherein said secondary voice channel comprises a plain old telephone system (POTS) analog voice channel.

7. A method of transporting a secondary voice channel by way of an integrated services digital network (ISDN) communication system having a framing structure that includes a bearer channel bandwidth, a data channel bandwidth and a repeated framing pattern bandwidth, comprising the steps of:
(a) providing a digitized secondary voice channel that is compressed to a bandwidth less than said repeated framing pattern bandwidth; and
(b) replacing selected framing bits of selected repeated framing patterns that make up said repeated framing pattern bandwidth with bits of said digitized secondary voice channel.

8. A method according to claim 7, wherein said secondary voice channel comprises a plain old telephone system (POTS) analog voice channel.

9. A method according to claim 7, wherein pluralities of bits of said digitized secondary voice channel are interleaved with pluralities of bits of said repeated framing pattern.

10. A method according to claim 7, wherein first and second complementary framing code bit patterns of said framing pattern bandwidth are alternately interleaved with pluralities of bits of said digitized secondary voice channel.

11. An arrangement for transporting a secondary voice channel by way of an integrated services digital network (ISDN) communication link having a transport bandwidth that includes a bearer channel bandwidth, a data channel bandwidth, a maintenance channel bandwidth and a framing pattern bandwidth, said arrangement comprising:
a framing multiplexer that is operative to assemble contents of said bearer channel, said data channel, said maintenance channel and said framing pattern for transport over said ISDN communication link; and
a framing controller, which is operative to cause said framing multiplexer to replace a portion of framing information contained in said framing pattern with a secondary voice channel.

12. An arrangement according to claim 11, wherein said secondary voice channel comprises a digitized secondary voice channel that has been compressed to a bandwidth less than said framing pattern bandwidth.

13. An arrangement according to claim 11, wherein said framing controller is operative to cause said multiplexer to replace contents of a plurality of segments of repeated framing information contained in said framing pattern with contents of said secondary voice channel.

14. An arrangement according to claim 13, wherein said multiplexer is operative to interleave contents of said secondary voice channel with prescribed segments of framing information of said framing pattern bandwidth.

15. An arrangement according to claim 14, wherein said multiplexer is operative to alternately interleave first and second framing code patterns of said framing pattern bandwidth with said contents of secondary voice channel that replace pluralities of segments of repeated framing information.

16. An arrangement according to claim 11, further including a framing demultiplexer that is operative to disassemble contents of said bearer channel, said data channel, said maintenance channel said framing information, and said secondary voice channel that have been transported over said ISDN communication link.

17. An arrangement according to claim 11, wherein said secondary voice channel comprises a plain old telephone system (POTS) analog voice channel.

\* \* \* \* \*